Feb. 22, 1927. 1,618,872
P. J. H. FREET
AUTOMATIC HITCH
Filed Oct. 17, 1924 2 Sheets-Sheet 2
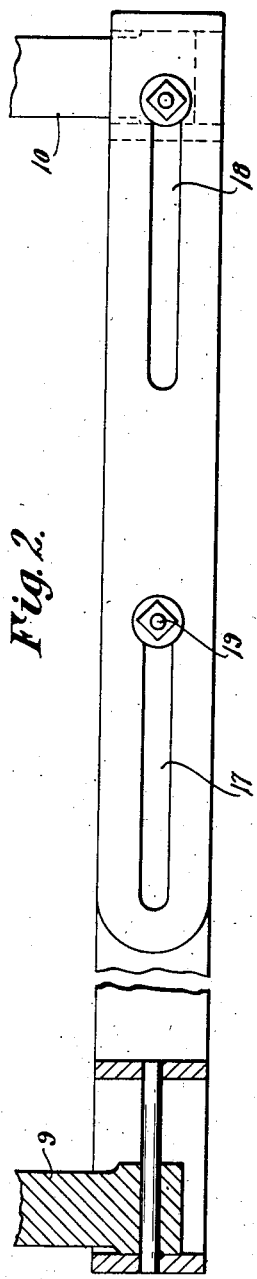
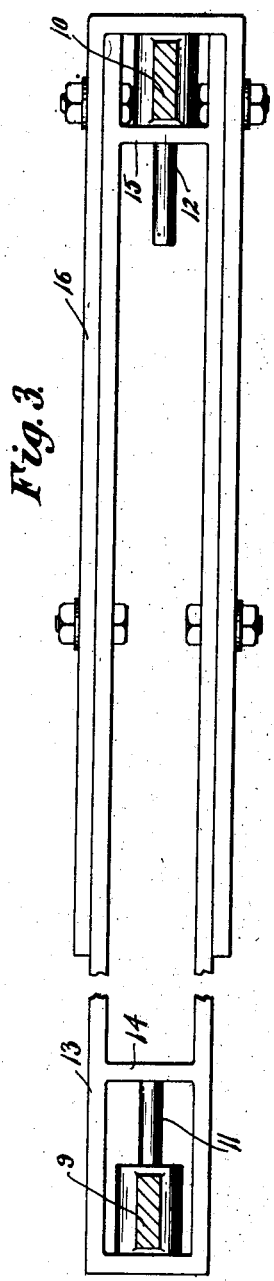
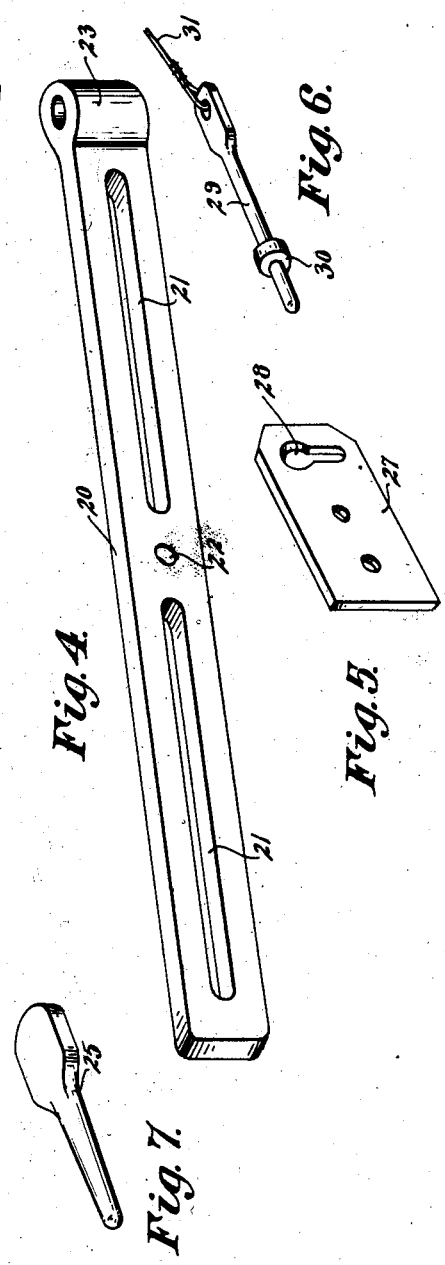
Paul J. H. Freet.
INVENTOR
BY Victor J. Evans
ATTORNEY
WITNESS:

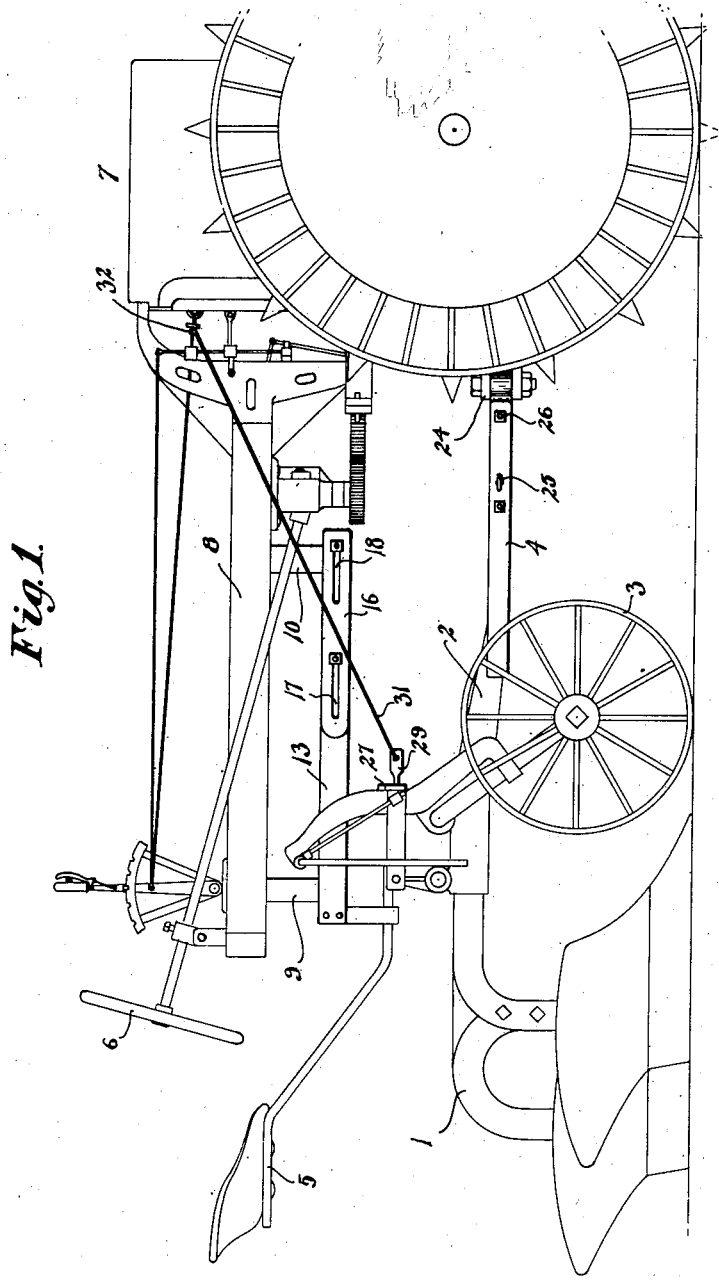

Patented Feb. 22, 1927.

1,618,872

UNITED STATES PATENT OFFICE.

PAUL J. H. FREET, OF COLUMBUS GROVE, OHIO.

AUTOMATIC HITCH.

Application filed October 17, 1924. Serial No. 744,242.

Ordinarily, plows are hitched to tractors directly, that is, there is no means of disconnecting the plow from the tractor when the plow shares strike a solid object, with the result that the plow beams are sprung or broken as is true with respect to other parts of the plow. This is especially true with respect to the two wheel tractor plows, and it is the object of this invention to provide a hitch between a tractor and a plow that will permit the tractor moving a determined distance away from the plow should the latter contact with an obstacle and thereafter automatically release the clutch of the tractor for stopping the further movement thereof so that injury will not be inflicted to the plow or other parts of the device.

To the attainment of the foregoing broadly stated objects and others which will appear as the nature of the invention is better understood, reference is to be had to the drawings which accompany and form part of this application.

In the drawings:—

Figure 1 is a side elevation of a tractor plow embodying the improvement.

Figure 2 is a side elevation, with parts in section of the upper member of the hitch.

Figure 3 is a top plan view thereof.

Figure 4 is a perspective view of the lower member of the hitch.

Figure 5 is a similar view of the plate attached to the plow frame.

Figure 6 is a similar view of the headed pin connected with the clutch release cable and engageable in the slotted plate.

Figure 7 is a similar view of the breakable pin which connects the lower hitch to the plow beam.

Referring to the drawings in detail, the numeral 1 designates a gang plow having its beams 2 supported on the usual wheels 3. The usual means is employed for raising or lowering the wheels to bring the plow points into or out of the ground and there is supported on the plow frame the driver's seat 5 arranged in close proximity to the steering wheel 6 as well as the control means for the gas and spark, the clutch operating means and the brake means for the tractor 7. The tractor, in the showing of the drawings, is of the two wheel construction, and the plow frame has its upper portion supported on the tail 8 of the tractor frame. The control and steering means for the tractor are also mounted on the tail 8.

The tail 8 of the tractor frame is provided with the usual depending lugs 9 and 10. These lugs have openings therethrough through which are passed pins 11 and 12 on the upper hitch member. The upper hitch member comprises a substantially rectangular frame 13, the same having partitions 14 and 15, the partition 14 being disposed adjacent to the inner end of the said frame 13, the partition 15 being disposed inward of the opposite and open end of the frame. The pin 11 is secured between the partition 14 and the closed end of the frame, while the pin 12 is secured on the closed end of the yoke-like member 16 and passes centrally through the partition 15. The yoke has its sides straddling the sides of the frame 13 and its said sides are provided with spaced elongated openings 17 and 18 respectively. These openings receive therethrough headed studs 19 respectively that extend laterally from the sides of the frame 13. The studs may be in the nature of bolts and are engaged by nuts which contact with washers that bridge the slots 18 and 19.

The forward end of the plow beams 2 may be bifurcated, or they may have secured thereto longitudinally extending plates between which there is arranged a bar 20. The bar is provided with spaced elongated slots 21 respectively, and between the slots with a transverse opening 22. The outer end of the bar is formed with a round head 23 having an opening therethrough to receive the usual pin that passes through the spaced ears or knuckles 24 on the frame of the tractor 7. Passing through the opening 22, and the members between which the bar 20 is received there is a breakable pin 25. Secured to the members that receive the bar 20 therebetween there are transverse pins, preferably in the nature of bolts 26 that also pass throguh the elongated slots 21 in the bar 20.

Secured on any desired portion of the plow frame there is a bracket 27. The bracket may be in the nature of a flat plate and is provided with a keyhole slot 28. Passing through this slot there is a pin 29 that has an annular enlargement 30 adjacent to one end thereof. The enlargement is passed through the larger opening of the keyhole slot to permit of the pin 30 being arranged in the restricted opening of the said slot. The pin has secured on its outer end a cable 31, and this cable is connected to the clutch operating lever 32 of the tractor.

Should the plow shares contact with an obstacle when being propelled by the tractor, the pin 25 will break, permitting the tractor to move forward a determined distance without influencing the plow. The movement is limited by the length of the slots in the upper and lower hitch members, but the said movement is sufficient to draw on the cable 31 to throw the clutch 32 to neutral position, and therefore halt the movement of the tractor. As the control mechanism for the tractor is attached to the tail 8, these parts will not be influenced by the forward movement of the tractor.

To again hitch the plow to the tractor, after the obstacle has been removed or the plow has been removed from the obstacle, the pin 29 is brought out of the keyhole slot 28 in the plate or bracket 27 so that the tractor can again be handled by the control levers and the gears shifted to reverse the movement of the tractor in the direction of the plow. A new breakable pin is again inserted through the opening 22 and the openings in the plow beam. The tractor and the connected plow are again operated in the usual manner.

It is believed that the foregoing description, when taken in connection with the drawings, will fully set forth the simplicity of the construction and the advantages of my improvement to those skilled in the art to which such inventions relate, but it is to be understood that I do not wish to be restricted to the precise details of construction herein set forth and may make such changes therefrom as fairly fall within the scope of what I claim. It is also to be understood that I do not desire restricting my improved hitch and automatic tractor clutch operating means to two wheeled tractors as disclosed by the drawings, as the same may be successfully employed between other classes of tractors and plows.

Having described the invention, I claim:—

In a device for the purpose set forth, the combination with a tractor having a table extension provided with spaced depending lugs, of a frame including parallel sides, a closed and an open end, partitions connecting the sides adjacent to the ends of the frame, a pin fixed to one of the partitions and the closed end of the frame, and said pin designed to be passed through one of the lugs of the tail of the tractor, a substantially U-shaped yoke having parallel arms disposed in lapping engagement with the arms of the frame and having its connecting end closing the open end of the frame, a pin on the said closed end of the yoke guided through an opening in the partition, adjacent said open end of the frame, and said pin passing through the second lug of the tail of the tractor, said yoke having its arms provided with longitudinal slots and headed binding elements passing through the slots and, secured to the sides of the frame.

In testimony whereof I affix my signature.

PAUL J. H. FREET.